(12) United States Patent
Cooperman et al.

(10) Patent No.: US 10,222,273 B2
(45) Date of Patent: Mar. 5, 2019

(54) THERMAL PROXY DEVICE USING COLOR CHANGING TECHNOLOGY

(71) Applicants: Isadore Cooperman, Freehold, NJ (US); Robert G. Geissler, Freehold, NJ (US)

(72) Inventors: Isadore Cooperman, Freehold, NJ (US); Robert G. Geissler, Freehold, NJ (US)

(73) Assignee: THERMOPROX, Freehold Township, NJ (US)

( * ) Notice: Subject to any disclaimer, the term of this patent is extended or adjusted under 35 U.S.C. 154(b) by 264 days.

(21) Appl. No.: 15/187,688

(22) Filed: Jun. 20, 2016

(65) Prior Publication Data

US 2016/0370234 A1    Dec. 22, 2016

Related U.S. Application Data (60) Provisional application No. 62/182,041, filed on Jun. 19, 2015.

(51) Int. Cl.
*G01K 11/12* (2006.01)
*G01K 11/06* (2006.01)

(52) U.S. Cl.
CPC .............. *G01K 11/12* (2013.01); *G01K 11/06* (2013.01)

(58) Field of Classification Search
CPC .. G01K 3/04; G01K 3/06; G01K 3/12; G01K 11/06; G01K 11/12
USPC .................. 116/206, 216, 217, 218, 219
See application file for complete search history.

(56) References Cited

U.S. PATENT DOCUMENTS

| | | | | |
|---|---|---|---|---|
| 4,163,427 | A * | 8/1979 | Cooperman et al. .. | G01K 11/06 116/207 |
| 6,694,913 | B2 * | 2/2004 | Cooperman ............. | G01K 3/04 116/206 |
| 7,011,037 | B2 * | 3/2006 | Cooperman ............. | G01K 3/04 116/206 |
| 7,770,534 | B2 * | 8/2010 | Cooperman ........... | G01K 3/005 116/206 |
| 8,957,780 | B2 * | 2/2015 | Cooperman et al. .. | G01K 11/06 340/539.1 |
| 2013/0068155 | A1* | 3/2013 | Patel ........................ | G01K 3/04 116/201 |

FOREIGN PATENT DOCUMENTS

| | | | | |
|---|---|---|---|---|
| DE | 20213589 | U1 * | 3/2003 | ................ A61J 1/06 |
| DE | 102016005075 | A1 * | 11/2017 | ........... A01N 1/0236 |
| DE | 102016005133 | A1 * | 11/2017 | ........... A01N 1/0236 |

* cited by examiner

*Primary Examiner* — R. A. Smith
(74) *Attorney, Agent, or Firm* — Porzio Bromberg & Newman P.C.

(57) ABSTRACT

A thermal proxy device for monitoring change in condition. The change in condition can be a change in temperature such as a change above or below a predetermined temperature or a freezing condition. An indicator used in the thermal proxy device can have the same physical-chemical properties as the product to be monitored. The indicator can have a similar thermal mass with similar specific gravity and/or specific heat of the material to be monitored. The indicator can be associated with a container of the material to be monitored.

20 Claims, 7 Drawing Sheets

THERMAL PROXY DEVICE USING COLOR CHANGING TECHNOLOGY

BACKGROUND OF THE INVENTION

The thermal journey that a temperature sensitive product takes, along the logistics trail from manufacturer to customer, is known as the "Cold Chain". It is along this trail that vaccines can be exposed to thermal conditions that are deleterious or even destructive to their intended use of protecting lives.

Many devices have been developed to measure the thermal history of products along the "Cold Chain". Some are expensive electronic recorders, others are inexpensive indicators, and some attempt to give an indication of the mean kinetic temperature of the products exposure experience.

Freeze-thaw indicators are known. For example, U.S. Pat. No. 4,163,427 discloses an apparatus in which melting ice is used to activate a dye formation in producing a color indication of thawing. A related invention uses a pigment rather than a dye to indicate a transition over the threshold temperature. U.S. Pat. Nos. 6,694,913 and 7,011,037 are directed to changed condition indicators. U.S. Pat. No. 7,770,534 is directed to a system and method for indication of temperature exposures beyond a set of predetermined limits that employs the salts of weak acid-strong base or of a strong acid-weak base compound as reactants. U.S. Pat. No. 8,957,780 is directed to a system for remotely monitoring changes in condition by measuring conductivity changes to solutions and/or emulsions together with color changes.

In the transfer or storage of many commercial products, such as vaccines, it is desirable to have some manner of indicating whether items that require freezer temperatures for stability, activity or the like have previously been thawed. Similarly, it is desirable to know whether a material that is stored frozen is allowed to thaw and subsequently is refrozen. Furthermore, it is desirable to know whether a material has been cooled below and then heated above a threshold temperature other than a freezing temperature (i.e., above or below the freezing temperature). Likewise it is desirable to indicate whether products have been subjected to high temperatures that might affect stability or activity.

It is desirable to provide a system including an indicator providing a thermal mass proxy for monitoring changes in condition.

SUMMARY OF THE INVENTION

The present invention relates to a thermal proxy device for monitoring change in condition. For example, the change in condition can be a change in temperature such as a change above or below a predetermined temperature or a freezing condition. The present invention provides a device for indicating a transition from a threshold temperature. In one embodiment, an alarm can be activated when the transition event occurs.

An indicator used in the thermal proxy device can have the same physical-chemical properties as the product to be monitored. For example, the indicator can have a similar thermal mass with similar specific gravity and/or specific heat of the material to be monitored. The indicator can be associated with a container of the material to be monitored. In one embodiment, the material to be monitored is a vaccine contained in a container and the indicator is associated with the container. The container for example a vial, a syringe or packaging for the vials or syringe. For example, both the vaccine material and the indicator can be water solutions or dispersions and hence have similar heat capacities such that the vaccine and the indicator would behave similarly at the same temperature. The vaccine can be related for example to pharmaceuticals and biologicals such as for example, insulin, antibiotics, immuni-globulins, emulsions, protein assays, trans-plants and the like. The indicator provides a physical and visual "proxy" for the vaccine or any other water-based temperature sensitive material.

In one embodiment, within a freeze/thaw indicator an absorbent substrate is saturated and dried with a first reactive material that reacts to produce a color when contacted with a second reactive material. The second reactive material is a water solution of electrolyte contained within containers (e.g., microcapsules) in the freeze/thaw indicator. When subjected to freezing temperatures, the water expands, the micro capsules break and release the second reactant water solution (on thawing), and finally the two reactive materials combine to produce a color. The indicator can trigger when either it freezes or overheats to give the same color change, such as dark blue, when the microcapsules break or melt, whichever comes first. Alternatively, the indicator can provide an indication for freeze only, such as dark blue, or for overheat only, such as red.

The present invention can provide a proxy experience of a vaccine along the "Cold Chain" By using exactly the same amount of liquid, in an exactly equivalent container as the vaccine, indicator of the present invention mimics the experience of the vaccine. If the vaccine freezes, so does the indicator of the present invention. However, if the color of the indicator has changed, the vaccine has been compromised.

In one embodiment, an indicator solution is impregnated into an absorbent substrate. For example, the absorbent substrate can be alumina. The absorbent substrate can be surface dried. The absorbent substrate can be coated with a thermally protective material to form particles or capsules. For example, the thermally protective material can be a wax. The wax melts at a threshold temperature to release the absorbent substrate and provide a high temperature indicator. For example, the threshold temperature can be in the range of 30 degrees to 50 degrees C. In one embodiment, the absorbent substrate is present in solution within a container. For example, the solution can be water or a solution that is reactive with the released indicator solution.

The invention will be more fully described by reference to the following drawings.

DETAILED DESCRIPTION

Reference will now be made in greater detail to a preferred embodiment of the invention, an example of which is illustrated in the accompanying drawings. Wherever possible, the same reference numerals will be used throughout the drawings and the description to refer to the same or like parts.

Figure 1:
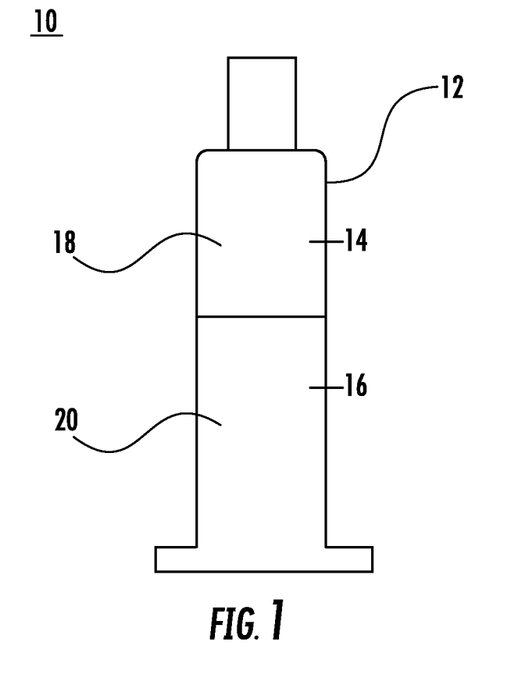
FIG. 1 is a schematic diagram of a thermal proxy device in accordance with the teachings of the present invention.

FIG. 1 is a schematic diagram of a thermal proxy device for monitoring changes in condition 10 in accordance with the teachings of the present invention. Container 12 includes indicator chamber 14 and sample chamber 16. Indicator 18 can be received in indicator chamber 14 and sample 20 can be received in sample chamber 16. For example indicator 18 can provide an irreversible visual indication of for example, room temperature to a freeze event, cold temperature to a freeze event, freezing temperature to a thaw event, room temperature to a high temperature event of greater than about 37.8 degrees C. (100 degrees F.) or temperature of about −20 degrees C. to greater than about 37.8 degrees C. In one embodiment, indicator 18 changes color depending on a status of sample 20 being monitored by indicator 18. For example, both sample 20 and indicator 18 can be water solutions or dispersions and hence have similar heat capacities such that the vaccine and the indicator would behave similarly at the same temperature. Sample 20 can be a vaccine material.

Figure 2:
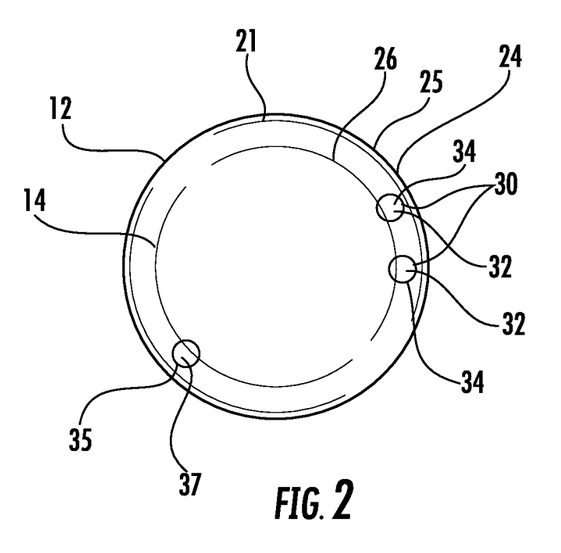
FIG. 2 is a top plan view of an indicator chamber of the thermal proxy device.

In one embodiment, indicator 18 includes first reactant 26 provided within indicator chamber 14 as shown in FIG. 2. First reactant 26 can be located within indicator chamber 14 in various ways. For example, first reactant 26 can be applied directly to surface 25 or first reactant 26 may be applied to a piece of material, such as filter paper, and the material placed inside indicator chamber 14. In addition to filter paper, other carriers may also be used with the present invention.

Capsule 30 is located within indicator chamber 14. Capsule 30 contains second reactant 32. Capsule 30 also contains a liquid 34. Liquid 34 is chosen such that it expands upon freezing. A preferred form of liquid 34 is an aqueous solution. Capsule 30 is designed such that it will fracture when liquid 34 freezes. After fracture, second reactant 32 can escape capsule 30 to mix with first reactant 26. This will not occur, however, while color change indicator 20 is in a frozen condition. When color change indicator 20 enters a thawed condition, liquid 34 melts/thaws, releasing second reactant 32. Second reactant 32 then mixes with first reactant 26 to form a pigment, indicating that color change indicator 20 has made the transition from a frozen condition to a thawed condition indicator chamber 14 can include second capsule 35 that will melt at a predetermined high temperature. Second capsule 35 contains second reactant 32 or alternatively contains third reactant 37. After melting, second reactant 32 or third reactant 37 can escape capsule 30 to mix with first reactant 26 to produce a colored pigment. An example changed condition indicator device is described in U.S. Pat. No. 7,770,534 hereby incorporated by reference in its entirety into this application.

In one embodiment, the quantity of indicator 18 can be the same quantity as sample 20 to provide a thermal mass proxy for sample 20. If sample 20 freezes indicator 18 will freeze in exactly the same way. When sample 20 thaws it may appear to be usable, but indicator 18 will have turned an irreversible color indicating that the vaccine has been irreversibly damaged.

In one embodiment, indicator 18 is an indicator solution impregnated into an absorbent substrate. Indicator is present within indicator chamber 14. For example, the absorbent substrate can be alumina. The absorbent substrate can be surface dried. The absorbent substrate can be coated with a thermally protective material to form particles or capsules. For example, the thermally protective material can be a wax. The wax melts at a threshold temperature to release the absorbent substrate and provide a high temperature indicator. For example, the threshold temperature can be in the range of 30 degrees to 50 degrees C. In one embodiment, the absorbent substrate is present in solution within indicator chamber 14. For example, the solution can be water or a solution that is reactive with the released indicator solution.

Figure 3:
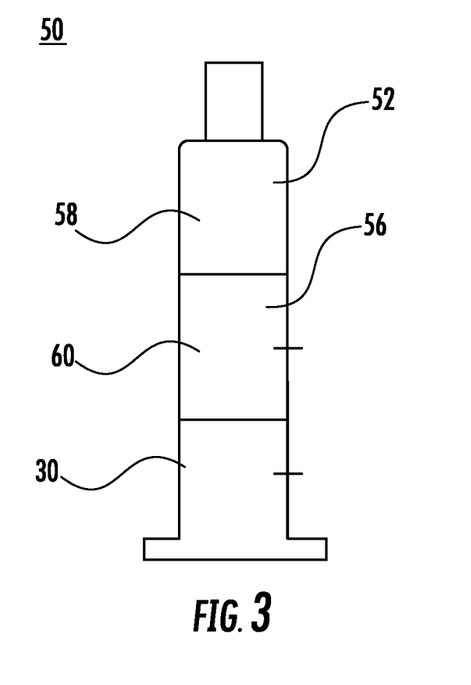
FIG. 3 is a schematic diagram of a device for monitoring dual changes in condition in accordance with the teachings of the present invention.

FIG. 3 is a device for monitoring dual changes in condition 50. Container 52 includes first indicator chamber 54 and second indicator chamber 56. First indicator 58 can be received in first indicator chamber 54 and second indicator 60 can be received in second indicator chamber 56. For example first indicator 58 can provide an irreversible visual indication of a high temperature event of greater than about 37.8 degrees C. (100 degrees F.). In one embodiment first indicator 58 is an indicator solution impregnated into an absorbent substrate. First indicator 58 is present within indicator chamber first indicator chamber 54. For example, the absorbent substrate can be alumina. The absorbent substrate can be surface dried. The absorbent substrate can be coated with a thermally protective material to form particles or capsules. For example, the thermally protective material can be a wax. The wax melts at a threshold temperature to release the absorbent substrate and provide a high temperature indicator. For example, the threshold temperature can be in the range of greater than about 37.8 degrees C. to about 50 degrees C. In one embodiment, the absorbent substrate is present in solution within first indicator chamber 54. For example, the solution can be water or a solution that is reactive with the released indicator solution. The absorbent substrate can have a weight such that the absorbent substrate sinks in the solution within indicator chamber 54 when the thermally protective material melts.

Second indicator 60 can provide an irreversible visual indication of a low temperature event for example, room temperature to a freeze event or cold temperature to a freeze event.

Figure 4:
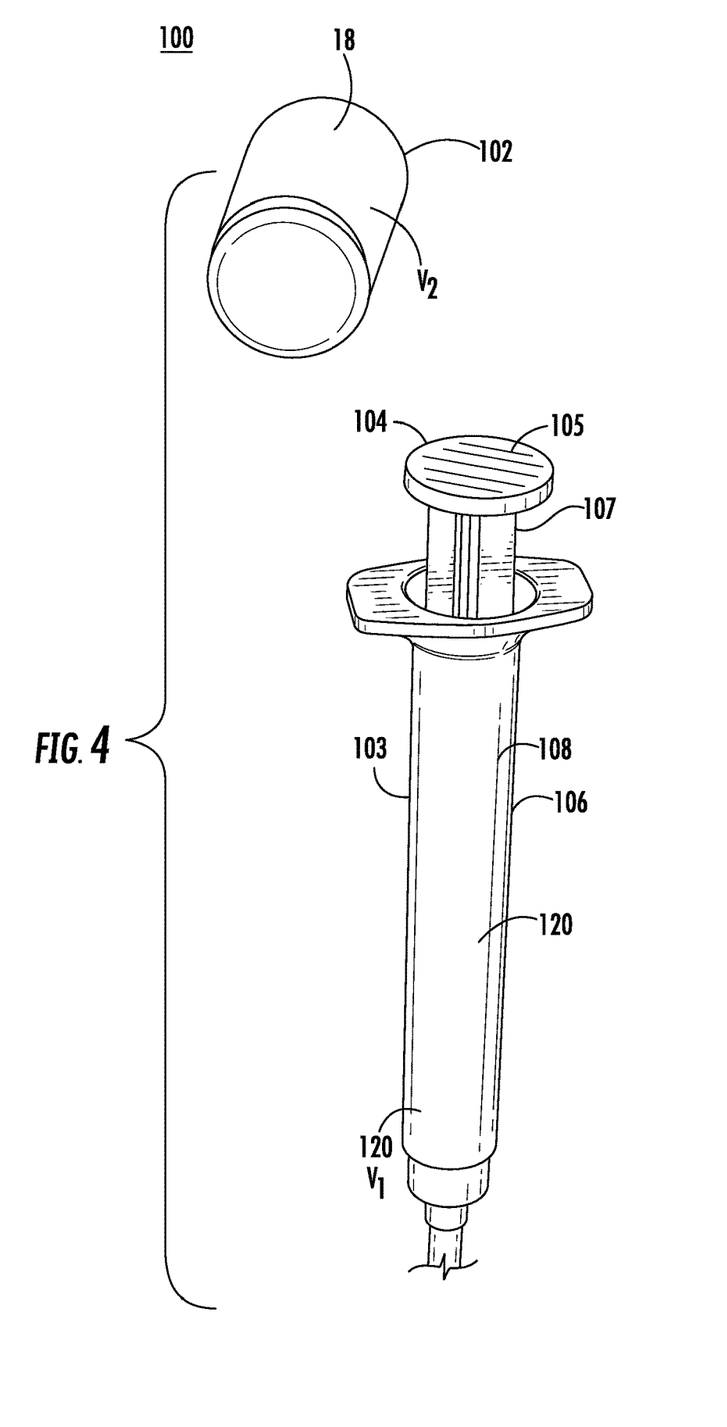
FIG. 4 is a schematic diagram of a thermal proxy device.

FIG. 4 is a schematic diagram of thermal proxy device 100. Thermal proxy device 100 includes indicator chamber 102 and syringe 103. For example, indicator chamber 102 can be a canister. Syringe 103 includes plunger rod 104 and plunger housing 106. Thumb plate 105 can be formed at end 107 of plunger rod 104. Plunger barrel 108 is formed within plunger housing 106. Sample 120 can be received in plunger barrel 108. For example, sample 120 can be a vaccine. After receipt of sample 120 in plunger barrel 108, plunger rod 104 can be received within plunger barrel 108 of plunger housing 106.

Indicator chamber 102 can be removably coupled to plunger rod 104 of syringe 103. For example, indicator chamber can be attached to plunger rod 104 with an adhesive or integral clamp. Indicator 18 can be received in indicator chamber 102. Volume V1 of sample 120 received in plunger barrel 108 can be substantially the same as volume V2 of indicator chamber 102 to have the same thermal mass conditions and provide a thermal mass proxy for sample 120.

Figure 5:
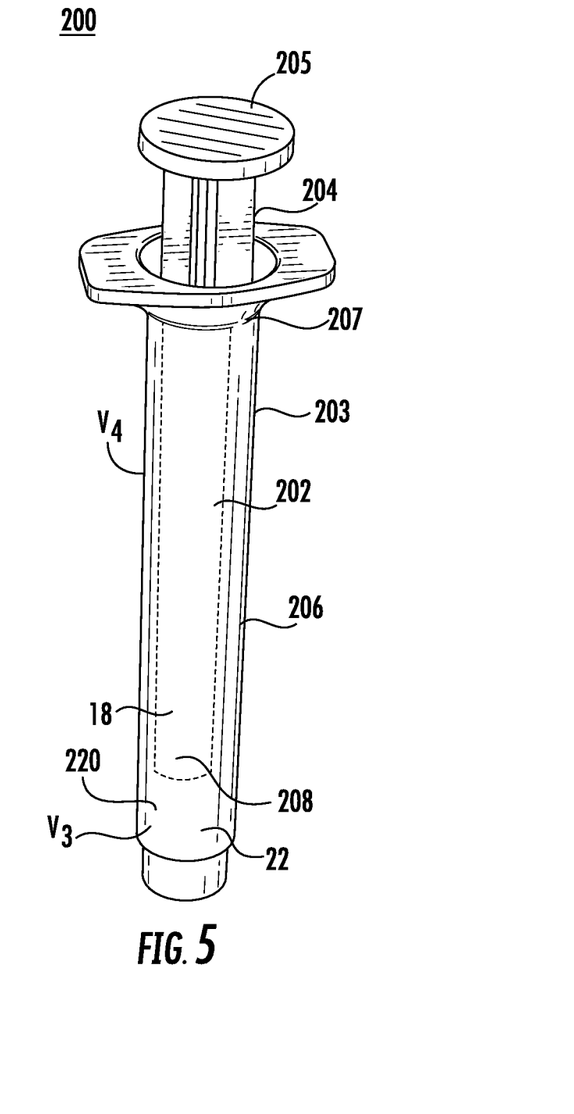
FIG. 5 is a schematic diagram of a thermal proxy device.

FIG. 5 is a schematic diagram of thermal proxy device 200. Thermal proxy device 200 includes syringe 203. Syringe 203 includes plunger rod 204 and plunger housing 206. Thumb plate 205 can be formed at end 207 of plunger rod 204. Indicator chamber 202 can be formed within plunger rod 104. Plunger barrel 208 is formed within plunger housing 206. Sample 220 can be received in plunger barrel 208. For example, sample 220 can be a vaccine. After receipt of sample 220 in plunger barrel 208, plunger rod 204 can be received within plunger barrel 208 of plunger housing 206.

Indicator 18 can be received in indicator chamber 202. Volume V3 of sample 220 received in plunger barrel 208 can be substantially the same as volume V4 of indicator chamber 202 to have the same thermal mass conditions and provide a thermal mass proxy for sample 220.

Figure 6A:
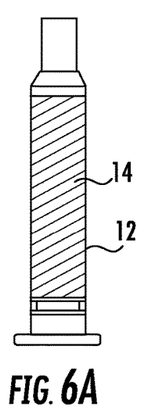
FIG. 6A is a drawing indicating a sample in a container in which a color change occurred.
Figure 6B:
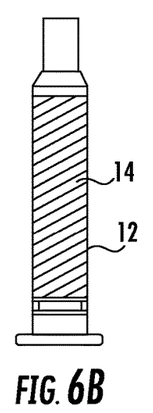
FIG. 6B is a drawing indicating a sample in a container having a normal color state.

FIG. 6A-6B are drawings showing a sample respectfully in a container in which a color change occurred or in a container having a normal color state. In FIG. 6A, a color change within the container shown in a first diagonal line pattern indicates that a temperature exceeded 77° F. FIG. 6B shows a normal color state within the container shown in a second diagonal line pattern. The color will change if the temperature goes below 32° F. or exceeds 77° F.

Figure 7:
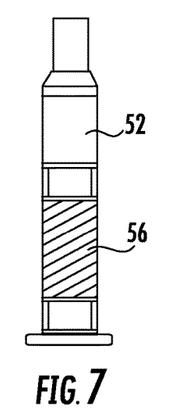
FIG. 7 is a drawing indicating a sample in a dual chamber container with an associated indicator.
Figure 8:
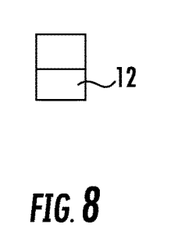
FIG. 8 is a drawing indicating a chamber for an indicator which can be associated with a container for a material to be monitored.

FIG. 7 shows container 52 of the present invention having high temperature indicator for >77° F. shown with the first diagonal line pattern and low temperature indicator shown with a third diagonal line pattern for temperatures <32° F. FIG. 8 is an embodiment of container 12 that can be associated or attached to a container having sample 20.

Figure 9A:
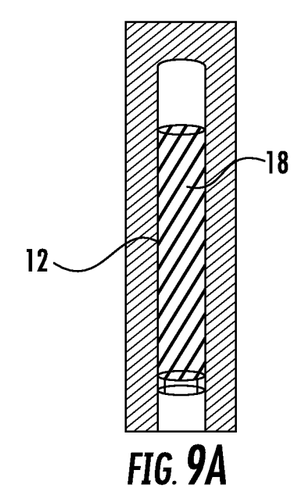
FIG. 9A is a drawing indicating a sample in a container having a pre-loaded thermal proxy indicator in a normal color state.
Figure 9B:
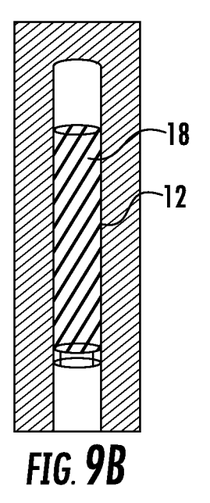
FIG. 9B is a drawing indicating a sample in a container having a pre-loaded thermal proxy indicator in a normal color state after freezing.
Figure 9C:
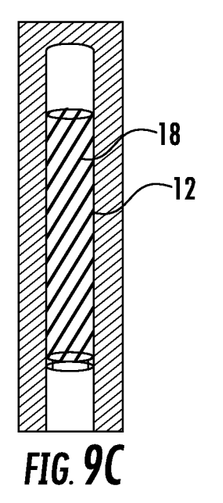
FIG. 9C is a drawing indicating a sample in a container having a pre-loaded thermal proxy in which a color change occurred.

FIGS. 9A-9C are drawings indicating a chamber for an indicator which can be associated with a container respectfully for a material to be monitored having a pre-loaded thermal proxy indicator in a normal color state shown with the second diagonal line pattern shown in FIG. 9A, having a pre-loaded thermal proxy indicator in a normal color state after freezing shown in FIG. 9B shown with the first diagonal line pattern and having a pre-loaded thermal proxy in which a color change occurred in FIG. 9C shown with the first diagonal line pattern. As shown in FIG. 9C, sample 20 on thawing can appear to be clear, or slightly hazy, but indicator 18 will be dark blue and indicate that the sample 20 should not be used.

Figure 10A:
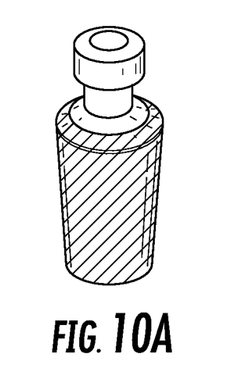
FIG. 10A is a drawing indicating a sample in a vial container having a pre-loaded thermal proxy indicator in a normal color state before freezing.
Figure 10B:
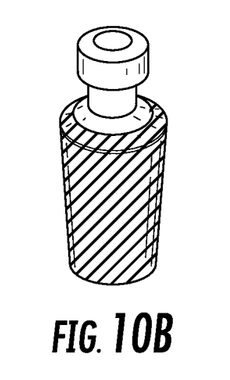
FIG. 10B is a drawing indicating a sample in a container having a pre-loaded thermal proxy indicator in a color change occurred after freezing and thawing.

FIG. 10A is a drawing indicating a sample in a vial container having a pre-loaded thermal proxy indicator in a normal color state before freezing shown with the second diagonal line pattern. FIG. 9B is a photograph indicating a sample in a container having a pre-loaded thermal proxy indicator in a color change occurred after freezing and thawing shown with the third diagonal line pattern and that the sample should not be used.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A thermoproxy device for monitoring changes in condition comprising:
    an indicator chamber for receiving a color indicator, the color indicator indicating a color change; and
    a sample chamber for receiving a sample,
    the indicator chamber being associated with the sample chamber,
    wherein the color indicator has at least one same physical-chemical property as the sample.

2. The thermoproxy device of claim 1 wherein the at least one same physical-chemical is selected from the group consisting of thermal mass, specific gravity and specific heat.

3. The thermoproxy device of claim 1 wherein the color indicator and the sample have the same volume.

4. The thermoproxy device of claim 1 wherein the color indicator is a an indicator solution
    impregnated into an absorbent substrate.

5. The thermoproxy of claim 4 wherein the absorbent substrate is alumina.

6. The thermoproxy device of claim 1 wherein said color indicator provides an irreversible
    visual indication of a condition selected from the group consisting of a room temperature to a freeze event, cold temperature to a freeze event, freezing temperature to a thaw event, room temperature to greater than about 37.8 degrees C. and a temperature of about −20 degrees C. to
    greater than about 37.8 degrees C.

7. The thermoproxy device of claim 1 wherein said color indicator includes a first color
    indicator and a second color indicator, said first color indicator indicating a freeze/thaw event and said second color indicator indicating a high temperature.

8. The thermoproxy device of claim 1 wherein said color indicator comprises a solution of a first color; a first reactant located in the solution or a surface of said indicator chamber; a capsule containing a liquid and a second reactant, said capsule being located within said indicator chamber; wherein said liquid freezes at a first threshold temperature and expands upon freezing whereby said capsule fractures from the liquid expansion and wherein said first and said second reactants combine to produce a pigment of a second color upon mixing, said first and said second colors being different.

9. The thermoproxy device of claim 8 further comprising a second capsule located within said indicator chamber and optionally a third reactant; wherein the formulation of said second capsule comprises a component that melts at a second threshold temperature and wherein said second capsule contains said second reactant or said optional third reactant; wherein when said optional third reactant is present, said third and first reactants combine to produce a pigment of a third color upon mixing, said third color being different from said first color.

10. The thermoproxy device of claim 1 wherein the indicator chamber includes a first indicator chamber and second indicator chamber, a first indicator received in the first indicator chamber and a second indicator received in the second indicator chamber, the first indicator providing an irreversible visual indication of a high temperature event of greater than about 37.8 degrees C. and the second indicator providing an irreversible visual indication of a low temperature event of room temperature to a freeze event or cold temperature to a freeze event.

11. The thermoproxy device of claim 1 wherein the sample chamber is a plunger barrel formed within a plunger housing, the indicator chamber can be removably coupled to a plunger rod, said plunger rod adapted to be received in said plunger housing.

12. The thermoproxy device of claim 1 wherein the sample chamber is a plunger barrel formed within a plunger housing, the indicator chamber being formed within said plunger rod, said plunger rod adapted to be received in said plunger housing.

13. The thermoproxy device of claim 1 wherein said sample is a vaccine.

14. A method for monitoring changes in condition comprising the steps of:
providing a color indicator in an indicator chamber, the color indicator indicating a color change; providing a sample in a sample chamber, and associating the indicator chamber with the sample chamber, wherein the color indicator has at least one same physical-chemical property as the sample, said at least one same physical-chemical property selected from the group consisting of thermal mass, specific gravity and specific heat.

15. The method of claim 14 wherein said color indicator provides an irreversible visual indication of a condition selected from the group consisting of a room temperature to a freeze event, cold temperature to a freeze event, freezing temperature to a thaw event, room temperature to greater than about 37.8 degrees C. and a temperature of about −20 degrees C. to greater than about 37.8 degrees C.

16. The method of claim 14 wherein said color indicator includes a first color indicator and a second color indicator, said first color indicator indicating a freeze/thaw event and said second color indicator indicating a high temperature.

17. The method of claim 14 wherein said color indicator comprises a solution of a first color; a first reactant located in the solution or a surface of said indicator chamber; a capsule containing a liquid and a second reactant, said capsule being located within said indicator chamber; wherein said liquid freezes at a first threshold temperature and expands upon freezing whereby said capsule fractures from the liquid expansion and wherein said first and said second reactants combine to produce a pigment of a second color upon mixing, said first and said second colors being different.

18. The method of claim 14 wherein the sample chamber is a plunger barrel formed within a plunger housing, the indicator chamber can be removably coupled to a plunger rod, said plunger rod adapted to be received in said plunger housing.

19. The method of claim 14 wherein the sample chamber is a plunger barrel formed within a plunger housing, the indicator chamber being formed within said plunger rod, said plunger rod adapted to be received in said plunger housing.

20. The method of claim 14 wherein said sample is a vaccine.

* * * * *